Figure 1:
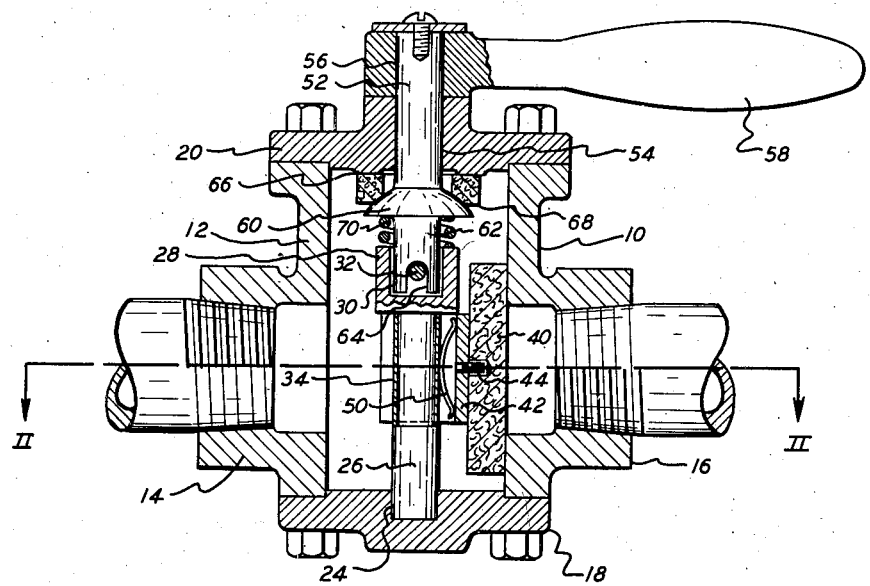

June 24, 1947.  R. O. MONROE ET AL  2,422,796

VALVE CONSTRUCTION

Filed July 15, 1944

Inventors
ROLLO O. MONROE and
JOHN W. HIERONYMUS
By Beaman & Langford
Attorneys

Patented June 24, 1947

2,422,796

UNITED STATES PATENT OFFICE 2,422,796

VALVE CONSTRUCTION

Rollo O. Monroe and John W. Hieronymus, Three Rivers, Mich., assignors to The Johnson Corporation, Three Rivers, Mich., a corporation of Michigan Application July 15, 1944, Serial No. 545,028

2 Claims. (Cl. 251—102)

The present invention relates to improvements in valve construction.

One of the objects of the present invention is to provide an improved fractional turned valve preferably using carbon graphite as a sealing medium seated under spring tension.

Another object of the invention is to provide a valve of the type described capable of handling steam and other higher temperature liquids in which the operating parts may be freely and easily manipulated.

Another object of the invention is to provide a carbon graphite valve which is inert to most fluids and is characterized by its ability to maintain an efficient seat in service.

A still further object of the invention is to provide a valve construction having the structural and functional advantages which become apparent from the following specification and claims.

Figure 2:
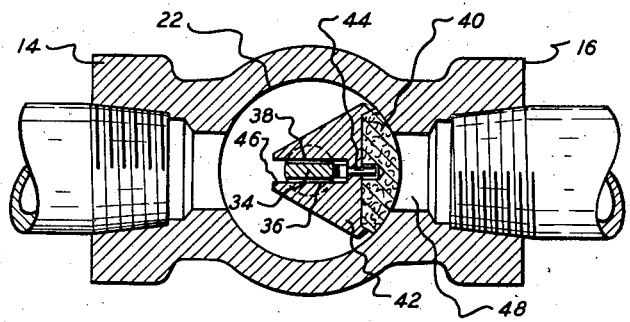

In the drawing,

Fig. 1 is a vertical cross-sectional view of our improved valve construction, and Fig. 2 is a cross-sectional view taken on line II—II of Fig. 1.

Referring to the drawing, the principles of construction of the present invention have been illustrated in connection with a valve 10 having a cast main body portion 12 with an inlet connection 14 and an outlet connection 16. Plates 18 and 20 close the upper and lower ends of the bore 22.

The plate 18 has a recess 24 in which the shaft 26 is received at its lower end. The upper end 28 of the shaft 26 is recessed at 30 and carries a cross pin 32. The central portion 34 of the shaft 26 is of reduced cross section having parallel sides 36 and 38. The molded carbon graphite sealing block 40 is mounted on a support 42 through a pin 44. The support 42 is shown slotted at 46 to receive the reduced portion 34 of the shaft 26, being horizontally slidable relative thereto and constituting a driving connection between the shaft 26 and the mount 42. For resiliently urging the sealing block 40 against the wall of the bore 22 which defines a seat surrounding the outlet 48, a spring 50 is inserted in the slot 46 and is in a position to react against the restricted reduced portion 34.

Our improved valve stem, which may be employed for the rotation of valve parts other than that illustrated, consists of a shaft portion 52 extending through a bore 54 in the plate 20. The shaft 52 may be square to be received in a similarly shaped hole 56 in the handle 58. Shown integral with the shaft 52 is a spherical segment 60 below which extends the driver portion 62 which is forked at 64 to receive the drive pin 32.

The underside of the plate 20 is provided with a machine boss 66 surrounding the bore 54. The seal of the shaft 52 is preferably in the form of a carbon raphite ring 68 having upper and lower surfaces complementary with the surface of the boss 66 and the spherical segment 60.

A coil spring 70 acting between the upper end of the shaft 26 and the underside of the spherical segment 60 resiliently urges the valve stem assembly upwardly to effect the seal between the sealing ring 68 and the surfaces associated therewith. The pin and slot connection defined by the parts 32 and 34 provides for relative axial movement of the valve stem to compensate for wear that may take place in the carbon graphite ring 68.

It will also be understood that fluid pressure within the valve 10 will act in conjunction with the spring 70 to bring the surfaces of the parts 60 and 62 into sealing engagement with the corresponding complementary surfaces of the sealing ring 68. It should be apparent that the valve stem construction herein described necessitates a minimum amount of machining in its construction. It will be further appreciated that even under extremely high pressures and temperatures very little effort will be required to partially or completely rotate the shaft 52.

Having thus described our invention what we desire to claim as new and to cover by Letters Patent is:

1. In a valve structure having an inlet, an outlet, a cylindrical chamber and a wall in which the outlet and its seat are defined, a valve assembly comprising a rotatable shaft, a part disposed on said shaft in driving relation and relatively movable in a direction toward the seat, a carbon graphite seal having a surface complementary with said chamber and floating on said part, and resilient means interposed between said part and said shaft for resiliently urging said part and seal into engagement with said seat.

2. A quarter turn valve comprising a cylindrical chamber, an inlet opening into said chamber, an outlet opening from said chamber, a seat surrounding said outlet and defined by the wall of said chamber, an operating shaft supported in said chamber, a carbon graphite seal having a surface complementary with the surface of said chamber and adapted to be moved toward and from sealing relation with said seat, a part on which said carbon graphite seal is supported with floating action, means constituting a driving radially floating connection between said part and said shaft, resilient means interposed between said shaft and said part to continue to urge said seal toward the walls of said chamber and means for at least partially rotating said shaft and seal into and out of sealing relation with said seat and outlet.

ROLLO O. MONROE.
JOHN W. HIERONYMUS.

REFERENCES CITED

The following references are of record in the file of this patent:

UNITED STATES PATENTS

| Number | Name | Date |
|---|---|---|
| 1,053,327 | Stebbins | Feb. 18, 1913 |
| 1,057,058 | Hoover | Mar. 25, 1913 |
| 1,076,802 | White | Oct. 28, 1913 |
| 1,125,530 | Heymann | Jan. 19, 1915 |
| 1,805,668 | Kelley | May 19, 1931 |
| 2,173,949 | Neveu | Sept. 26, 1939 |
| 1,808,495 | Daddysman | June 2, 1931 |

Certificate of Correction

Patent No. 2,422,796.

June 24, 1947.

ROLLO O. MONROE ET AL.

It is hereby certified that error appears in the printed specification of the above numbered patent requiring correction as follows: Column 2, line 12, for "raphite" read *graphite*; and that the said Letters Patent should be read with this correction therein that the same may conform to the record of the case in the Patent Office.

Signed and sealed this 26th day of August, A. D. 1947.

[SEAL]

LESLIE FRAZER,
*First Assistant Commissioner of Patents.*